United States Patent
Huang

(10) Patent No.: US 9,193,063 B2
(45) Date of Patent: Nov. 24, 2015

(54) TOOL POSITIONING PAD

(71) Applicant: Kevin Huang, Taichung (TW)

(72) Inventor: Kevin Huang, Taichung (TW)

( * ) Notice: Subject to any disclaimer, the term of this patent is extended or adjusted under 35 U.S.C. 154(b) by 0 days.

(21) Appl. No.: 14/203,521

(22) Filed: Mar. 10, 2014

(65) Prior Publication Data

US 2015/0251311 A1    Sep. 10, 2015

(51) Int. Cl.
| | |
|---|---|
| B65D 85/28 | (2006.01) |
| B25H 3/04 | (2006.01) |
| F16B 2/14 | (2006.01) |
| B25H 3/00 | (2006.01) |

(52) U.S. Cl.
CPC .. *B25H 3/04* (2013.01); *F16B 2/14* (2013.01); *B25H 3/003* (2013.01)

(58) Field of Classification Search
CPC ........... B25H 3/00; B25H 3/003; B65D 85/00
USPC ......... 206/372–379, 477, 482, 486; 211/60.1, 211/69, 70, 70.6; 248/65, 73, 74.1, 309.1, 248/311.2, 313, 316.1, 316.7
See application file for complete search history.

(56) References Cited

U.S. PATENT DOCUMENTS

| | | | |
|---|---|---|---|
| 6,209,827 B1* | 4/2001 | Kawai | 248/73 |
| 6,244,447 B1* | 6/2001 | Frieze et al. | 211/70.6 |
| 6,923,407 B2* | 8/2005 | Takeuchi | 248/73 |
| 7,267,244 B1* | 9/2007 | Dalhamer | 220/574 |
| 7,424,958 B1* | 9/2008 | Eley | 211/70.6 |
| 8,371,444 B1 | 2/2013 | Huang | |
| 8,505,720 B2 | 8/2013 | Huang | |
| 2002/0023855 A1* | 2/2002 | Cho | 206/373 |
| 2006/0272979 A1* | 12/2006 | Lubbers et al. | 206/557 |
| 2009/0146032 A1* | 6/2009 | Bettenhausen et al. | 211/70.6 |
| 2011/0290697 A1* | 12/2011 | Dalhamer | 206/557 |

* cited by examiner

*Primary Examiner* — Luan K Bui

(57) ABSTRACT

A tool positioning pad has a base pad, at least one securing member and at least one holder member. The base pad is provided with a plurality of positioning holes, the securing member includes at least one connecting rod acceptable within the plurality of positioning holes. The tool positioning pad comprises the securing member and the holder member capable of providing adjustable holding space. When a hand tool is placed on the base pad, the holder member and the securing member together clamping the hand tool on the base pad.

10 Claims, 7 Drawing Sheets

TOOL POSITIONING PAD

BACKGROUND OF THE INVENTION

1. Field of the Invention

The present invention relates to a tool positioning pad, and in particular to a tool positioning pad, a tool positioning pad capable of storing different sizes hand tool.

2. Description of Prior Art

Many typical tool boxes provide a tool display board, which can display and secure different tools.

For example, a conventional tool board is capable of storing a plurality of screw driver bits and handles or sockets, but not other hand tools.

Therefore, it is desirable to provide a tool positioning pad for various hand tools to mitigate and/or obviate the aforementioned problems.

SUMMARY OF THE INVENTION

An objective of the present invention is to provide a tool positioning pad capable of storing and displaying various hand tools.

In order to achieve the above mentioned objective, the tool positioning pad has a base pad, at least one securing member and at least one holder member. The base pad is provided with a plurality of positioning holes, the securing member includes at least one connecting rod acceptable within the plurality of positioning holes.

The holder member includes a rotatable member, a positioning rod and a restoring spring, an end of the rotatable member is provided with a positioning aperture, the positioning rod is pivoted with the positioning aperture and another end of the positioning rod is insertable into the plurality of positioning holes. Another end of the rotatable member provides a holding end rotatable around the positioning aperture, and the restoring spring is mounted between the rotatable member and the positioning rod.

The positioning aperture includes a first narrow section and a first wide section, and a securing portion is provided between the first narrow section and the first wide section. The positioning rod has an upper narrow section corresponding to the first narrow section and lower wide section corresponding to the first wide section, and a limiting portion is provided between the upper narrow section and the lower wide section away from the securing portion, the securing portion and the limiting portion separated at a maximum distance, and a restoring spring is jacketed onto the lower wide section, the lower wide section further provided with a connecting aperture for accepting an end of the restoring spring, and the first wide section further provided with a connecting slot for accepting an end of the restoring spring.

The above objectives and structural and functional features of the present invention will be described in more detail with reference to preferred embodiment thereof shown in the accompanying drawings

DETAILED DESCRIPTION OF THE INVENTION

Figure 1:
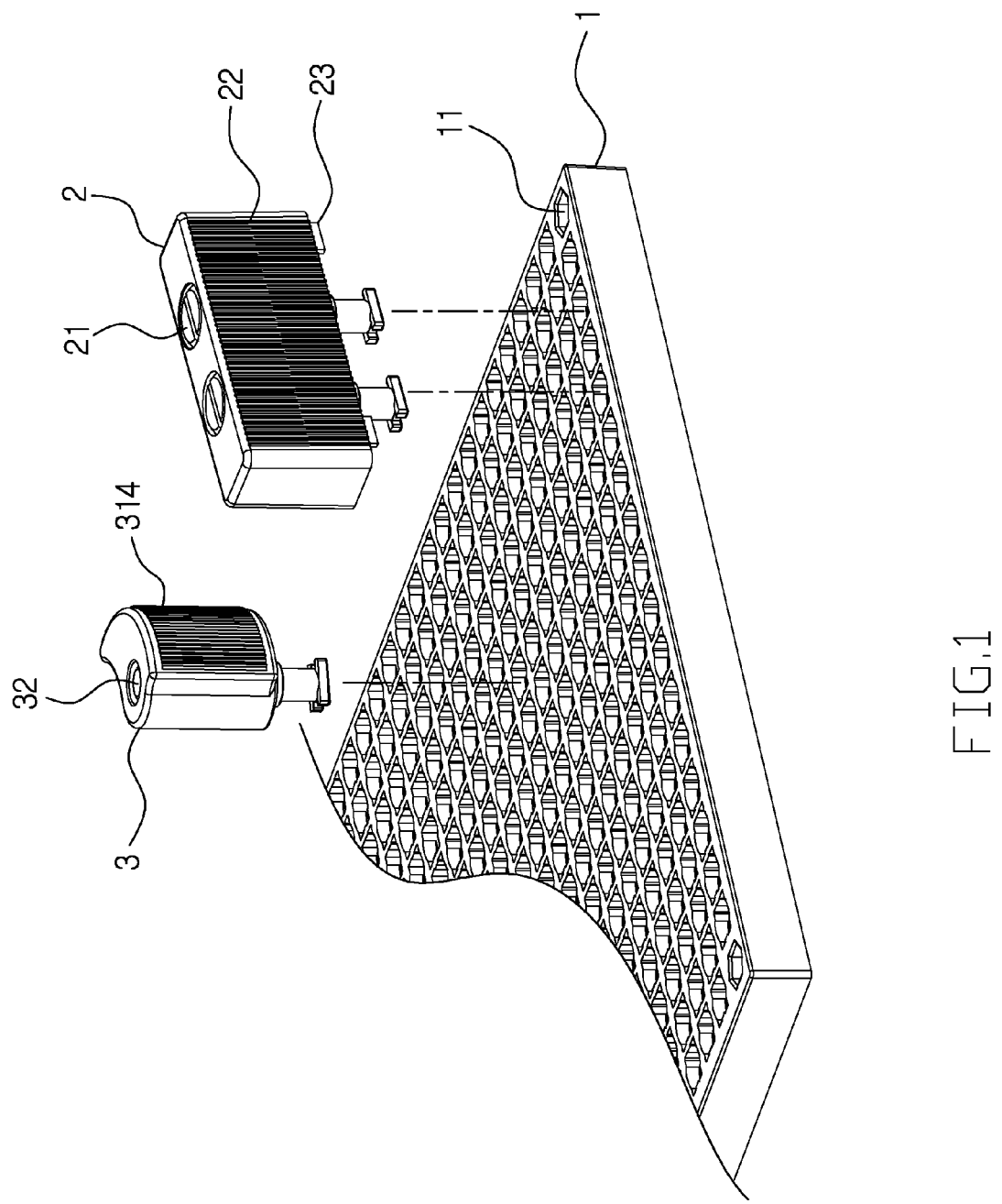
FIG. 1 is a perspective view of a tool positioning pad according to an embodiment of the present invention.
Figure 2:
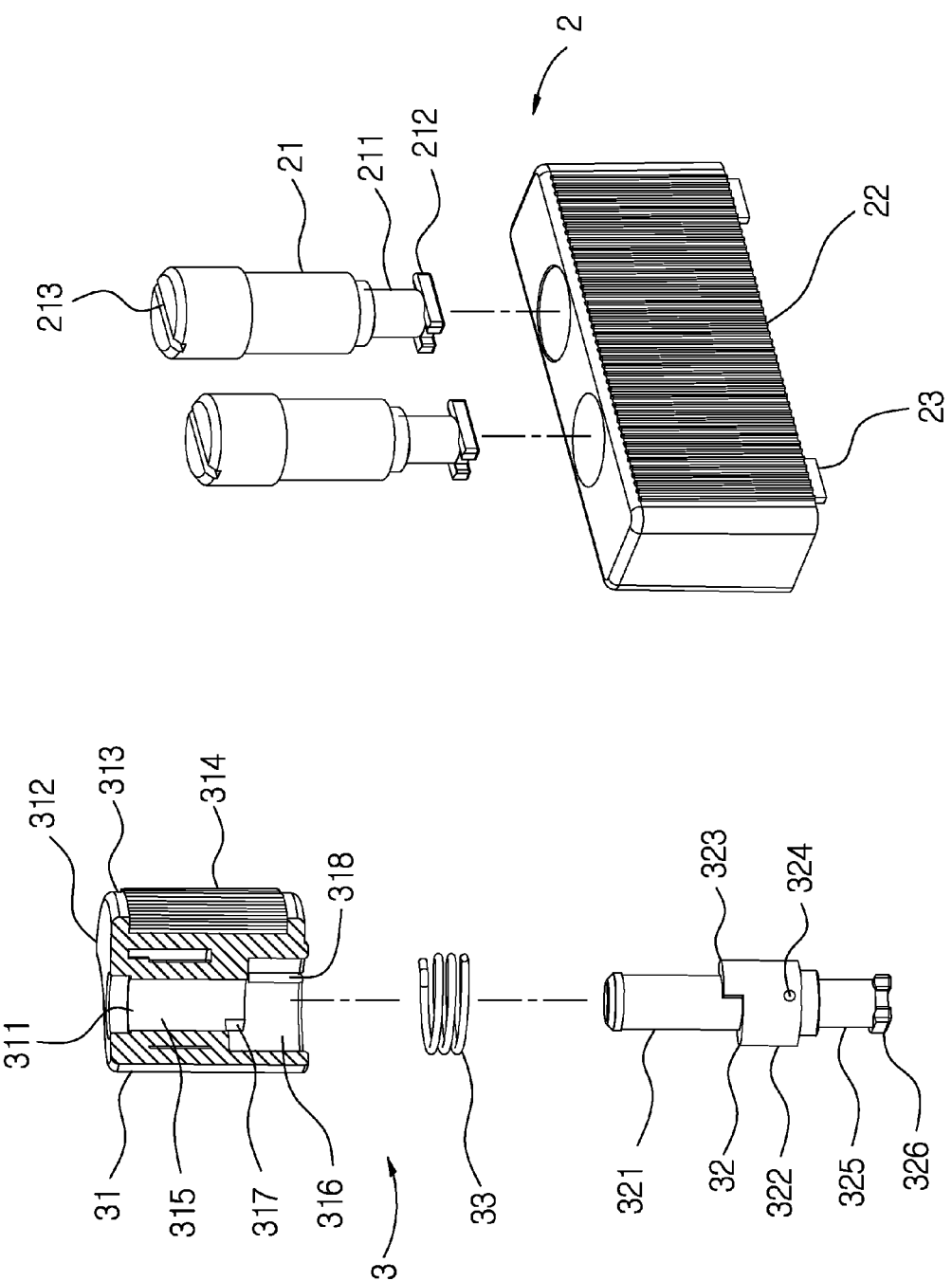
FIG. 2 is an exploded view of a securing member and an holder member according to the embodiment of the present invention.
Figure 3:
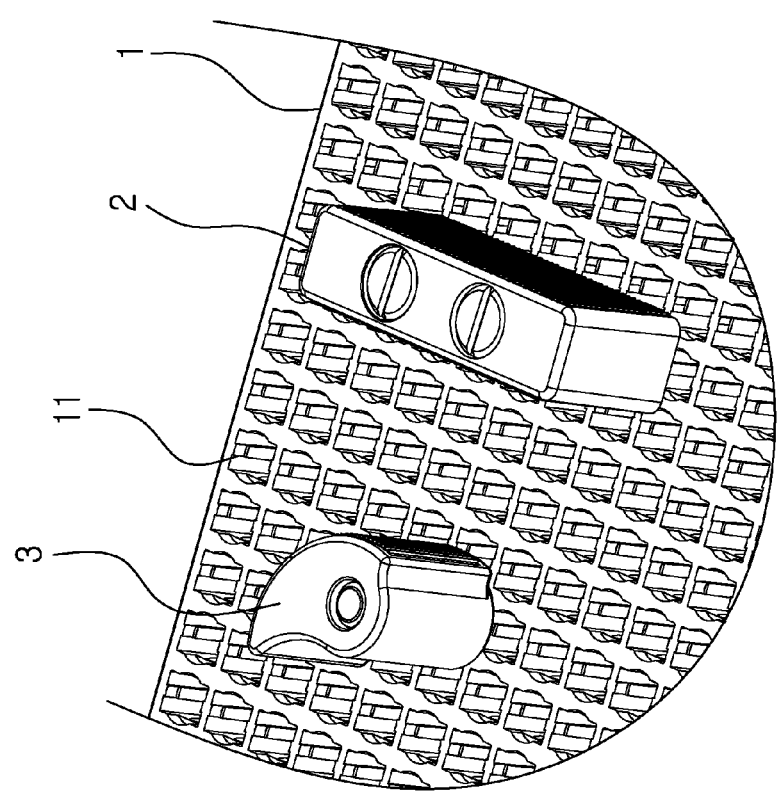
FIG. 3 is a schematic drawing of the securing member and the holder member on the base pad according to the embodiment of the present invention.
Figure 4:
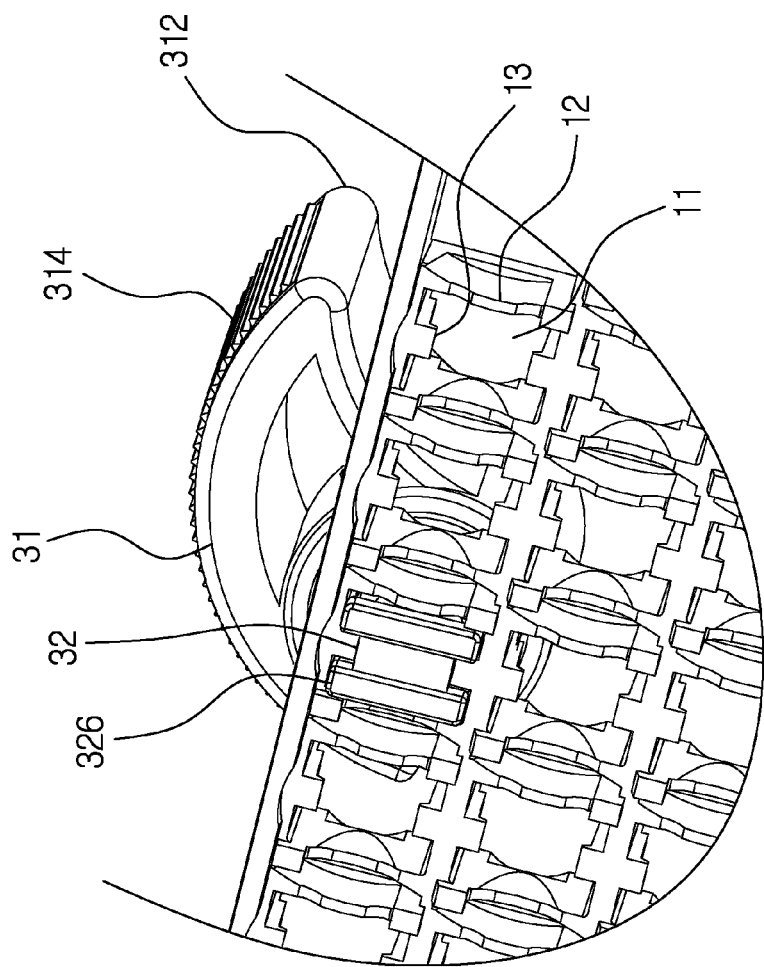
FIG. 4 and FIG. 5 are schematic drawing showing the holder member being inserted into the base pad according to the embodiment of the present invention.
Figure 5:
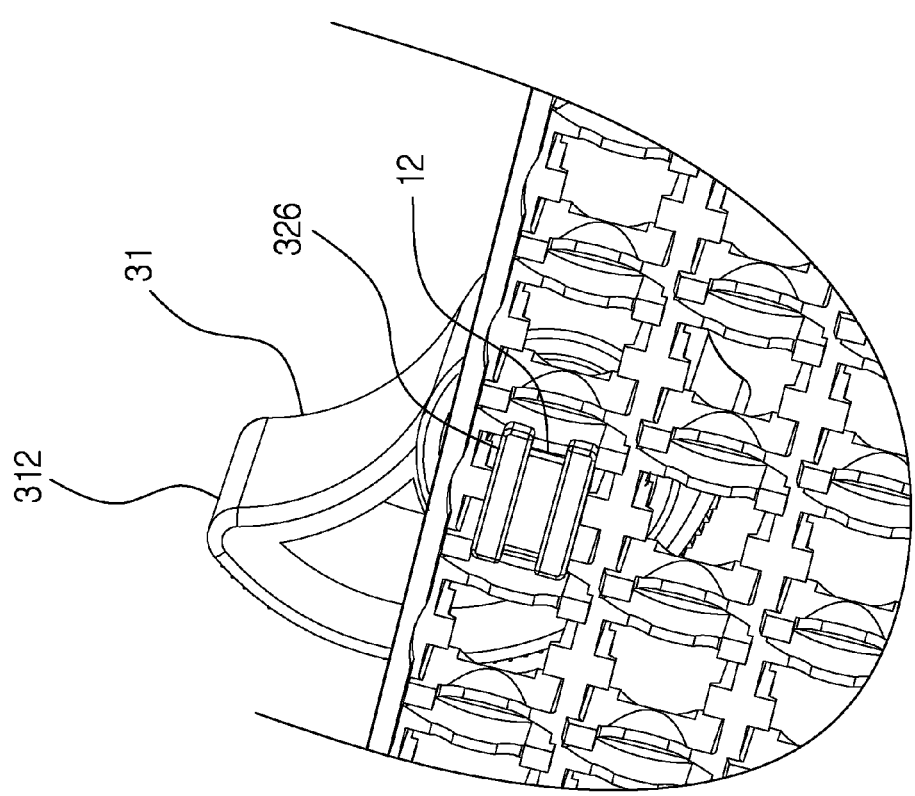

Please refer to FIG. 1 to FIG. 6. A tool positioning pad comprises a base pad 1, at least one securing member 2 and at least one holder member 3.

The base pad 1 is provided with a plurality of positioning holes 11, and the securing member 2 includes at least one connecting rod 21 acceptable within the plurality of positioning holes 11.

The holder member 3 includes a rotatable member 31, a positioning rod 32 and a restoring spring 33. An end of the rotatable member 31 is provided with a positioning aperture 311, the positioning rod 32 is pivoted with the positioning aperture 311 and another end of the positioning rod 32 is insertable into the plurality of positioning holes 11. Another end of the rotatable member 31 provides a holding end 312 rotatable around the positioning aperture 311, and the restoring spring 33 is mounted between the rotatable member 31 and the positioning rod 32.

Figure 7:
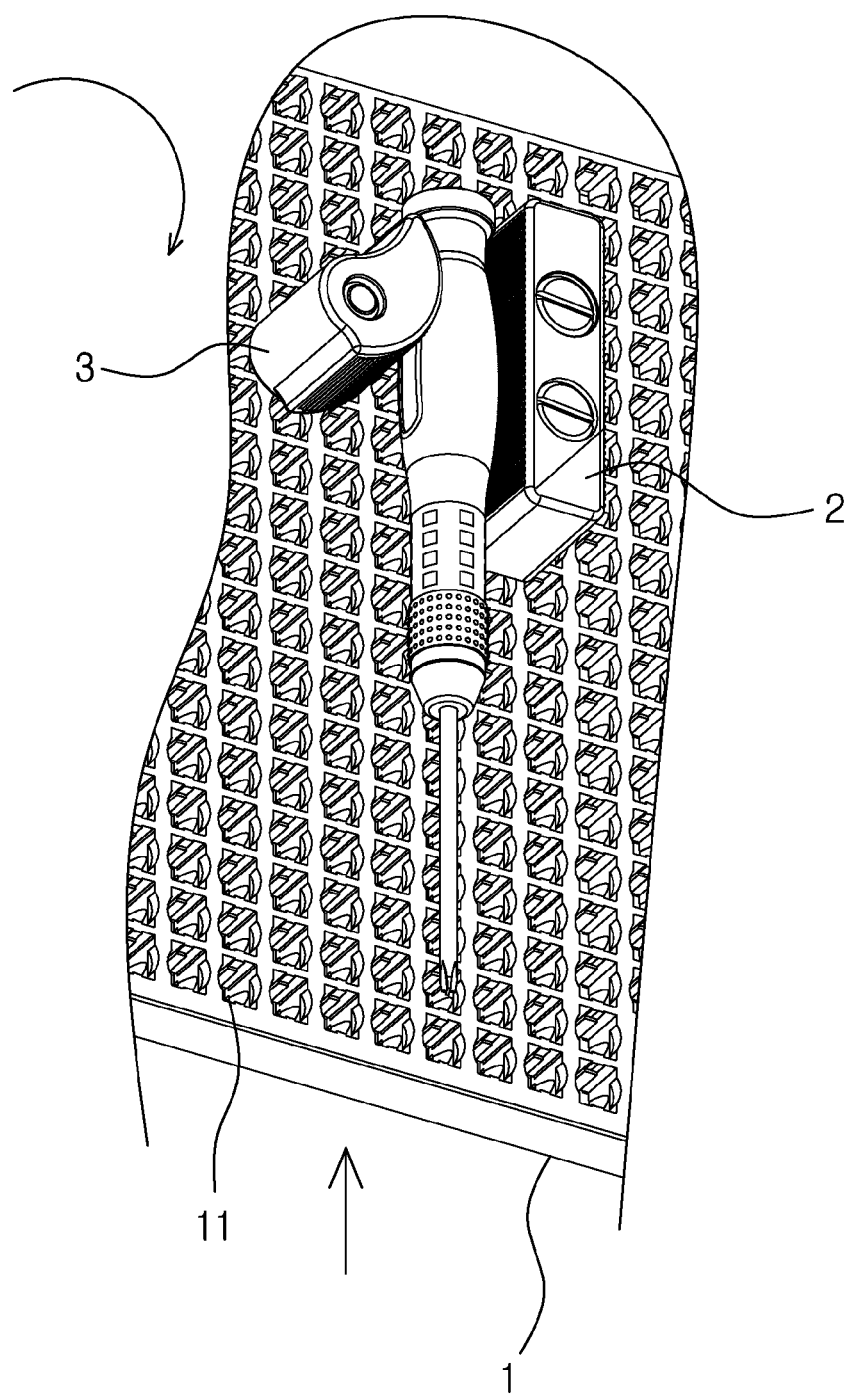
FIG. 7 is a schematic drawing showing a securing member and a holder member holding a screw driver according to an embodiment of the present invention.

When the securing member 2 and the holder member 3 are respectively inserted into the base pad 1 via the connecting rod 21 and the positioning rod 32, the holding end 312 of the rotatable member 31 faces the securing member, and an object (a screw driver as shown in FIG. 7) is placed between the securing member 2 and the holder member 3. Therefore, a user can rotate the rotatable member 31 to open the gap, and the restoring spring 33 makes the holding end 312 can apply a clamping strength to the object.

Furthermore, a side of the rotatable member 31 is provided with a curved surface 313 extending from the positioning aperture 311 to the holding end 312. Therefore, the surface area from the rotatable member 31 is close to the positioning rod 32 which can provide better holding stability, The curved surface 313 and the securing member 2 are respectively provided with anti-slip grooves 22, 314. The anti-slip grooves 22, 314 might be rubber toothed sheet, which can provide better holding stability.

Moreover, the positioning aperture 311 includes a first narrow section 315 and a first wide section 316, and a securing portion 317 is provided between the first narrow section 315 and the first wide section 316. The positioning rod 32 has an upper narrow section 321 corresponding to the first narrow section 315 and a lower wide section 322 corresponding to the first wide section 316, and a limiting portion 323 is provided between the upper narrow section 321 and the lower wide section 322 away from the securing portion 317. The securing portion 317 and the limiting portion 323 are separated by a maximum distance, and a restoring spring 33 is jacketed onto the lower wide section 322. the lower wide section 322 is further provided with a connecting aperture 324 for accepting an end of the restoring spring 33, and the first wide section 316 is further provided with a connecting slot 318 for accepting an end of the restoring spring 33.

The connecting rod 21 and the positioning rod 32 is respectively provided with a connecting section 211, 325 insertable into the plurality of positioning holes and two parallel limiting ribs 212, 326 at a bottom of connecting section 211, 32.

The base pad 1 is further provided with a protruding edge 12 adjacent to a bottom edge of the plurality of position holes 11, which can be placed between the two limiting ribs 212, 326 when the connecting section 211, 325 is rotated. Please refer to FIG. 4 and FIG. 5 again, for the holder member 3, when the connecting section 325 is inserted into the position holes 11, the two limiting ribs 326 are exposed at the bottom of base pad 1, by rotating the positioning rod 32 can force the protruding edge 12 to be sandwiched between the two limiting ribs 326, such that the base pad 1 and the holder member 3 both provide a holding strength. Same structure is provide between the base pad 1 and the securing member 2.

In addition, the connecting rod 21 is provided with an operating slot 213, which is a flat slot in this embodiment but can be various for other different hand tools.

A bottom of the securing member 2 is provided with a plurality of positioning ribs 23 capable of engaging with the plurality of positioning holes 11, such that the securing member 2 engages with the base pad 1 strongly.

An inner side of the position holes 11 is provided with two guiding ribs 13 corresponding to the limiting rib 212, 326, such that when the connecting rod 21 or the positioning rod 32 is inserted in the plurality of position holes 11, the guiding ribs 13 limit the moving direction of the connecting rod 21 and the positioning rod 32.

Figure 6:
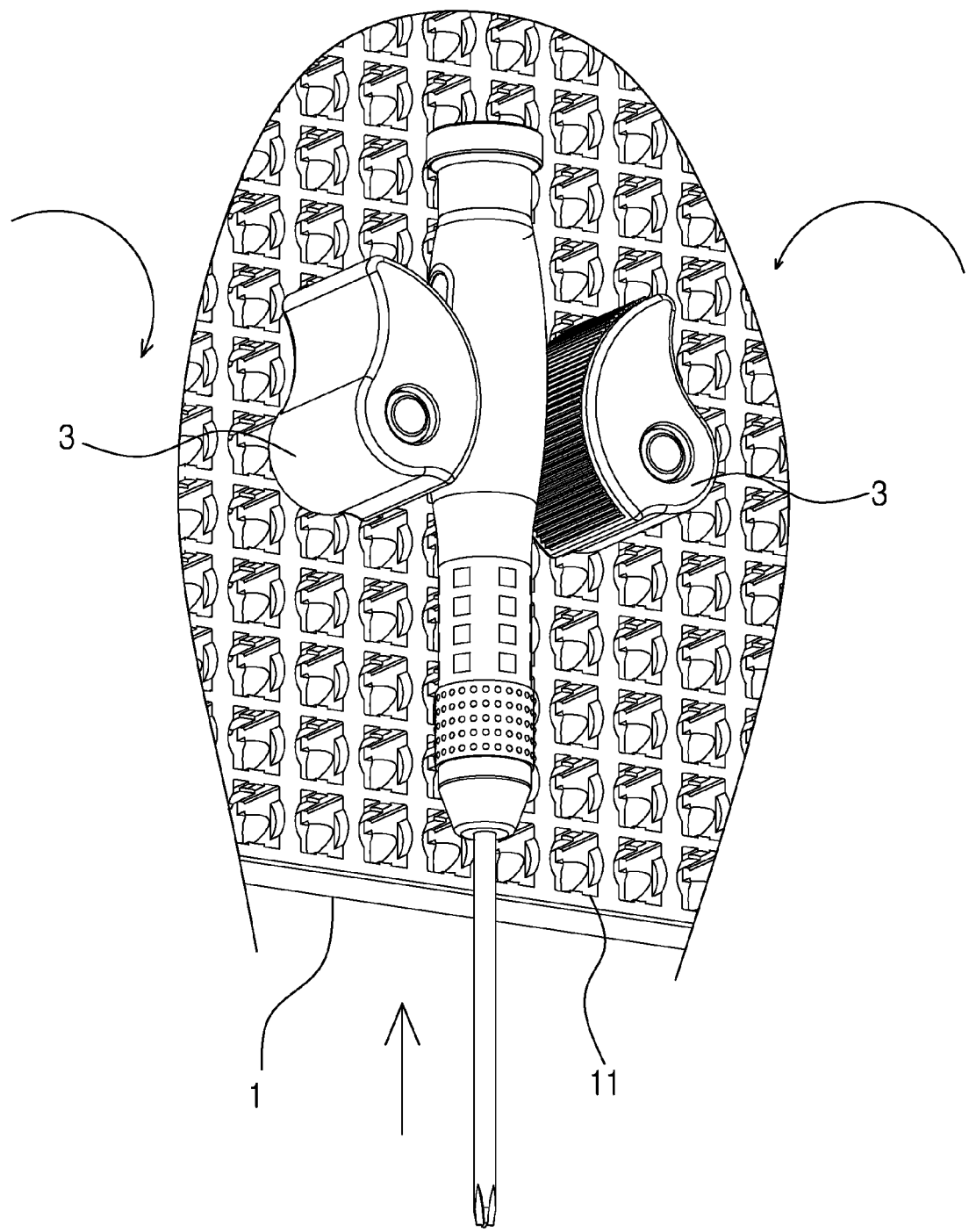
FIG. 6 is a schematic drawing showing two symmetric holder members holding a screw driver according to an embodiment of the present invention.

According to the previous description, the tool positioning pad in the embodiment of the present invention comprises the securing member 2 and the holder member 3 capable of providing adjustable holding space. When a hand tool is placed on the base pad 1, the holder member 3 and the securing member 2 together clamping the hand tool on the base pad 1. Furthermore, as shown in FIG. 6, there are two holder members 3 but no securing member 2.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A tool positioning pad comprising a base pad, at least one securing member and at least one holder member, wherein:
   the base pad is provided with a plurality of positioning holes, the securing member includes at least one connecting rod acceptable within the plurality of positioning holes; and
   the holder member includes a rotatable member, a positioning rod and a restoring spring, an end of the rotatable member provided with a positioning aperture, the positioning rod pivoted with the positioning aperture and another end of the positioning rod insertable into the plurality of positioning holes, another end of the rotatable member providing a holding end rotatable around the positioning aperture, and the restoring spring is mounted between the rotatable member and the positioning rod.

2. The tool positioning pad as claimed in claim 1, wherein the securing member is provided with anti-slip grooves.

3. The tool positioning pad as claimed in claim 1, wherein a side of the connecting rod is provided with an operating slot.

4. The tool positioning pad as claimed in claim 1, wherein a bottom of the securing member is provided with a plurality of positioning ribs capable of engaging with the plurality of positioning holes.

5. The tool positioning pad as claimed in claim 1, wherein the positioning aperture includes a first narrow section and a first wide section, and a securing portion is provided between the first narrow section and the first wide section, the positioning rod having an upper narrow section corresponding to the first narrow section and a lower wide section corresponding to the first wide section, and a limiting portion is provided between the upper narrow section and the lower wide section away from the securing portion, the securing portion and the limiting portion separated at a maximum distance, and the restoring spring is jacketed onto the lower wide section, the lower wide section further provided with a connecting aperture for accepting an end of the restoring spring, and the first wide section further provided with a connecting slot for accepting another end of the restoring spring.

6. The tool positioning pad as claimed in claim 1, wherein a side of the rotatable member is provided with a curved surface extending from the positioning aperture to the holding end.

7. A tool positioning pad comprising a base pad, and at least two holder members, wherein:
   the base pad is provided with a plurality of positioning holes; and
   each of the two holder members respectively includes a rotatable member, a positioning rod and a restoring spring, an end of the rotatable member provided with a positioning aperture, the positioning rod pivoted with the positioning aperture and another end of the positioning rod insertable into the plurality of positioning holes, another end of the rotatable member providing a holding end rotatable around the positioning aperture, and the restoring spring is mounted between the rotatable member and the positioning rod.

8. The tool positioning pad as claimed in claim 7, wherein the positioning aperture includes a first narrow section and a first wide section, and a securing portion is provided between the first narrow section and the first wide section, the positioning rod having an upper narrow section corresponding to the first narrow section and a lower wide section corresponding to the first wide section, and a limiting portion is provided between the upper narrow section and the lower wide section away from the securing portion, the securing portion and the limiting portion separated by a maximum distance, and the restoring spring is jacketed onto the lower wide section, the lower wide section further provided with a connecting aperture for accepting an end of the restoring spring, and the first wide section is further provided with a connecting slot for accepting another end of the restoring spring.

9. The tool positioning pad as claimed in claim 7, wherein a side of the rotatable member is provided with a curved surface extending from the positioning aperture to the holding end.

10. The tool positioning pad as claimed in claim 9, wherein the curved surface is provided with anti-slip grooves.

* * * * *